April 20, 1926.
T. W. KIENAST
ENVELOPE MACHINE
Original Filed Oct. 31, 1921     10 Sheets-Sheet 1
1,581,316
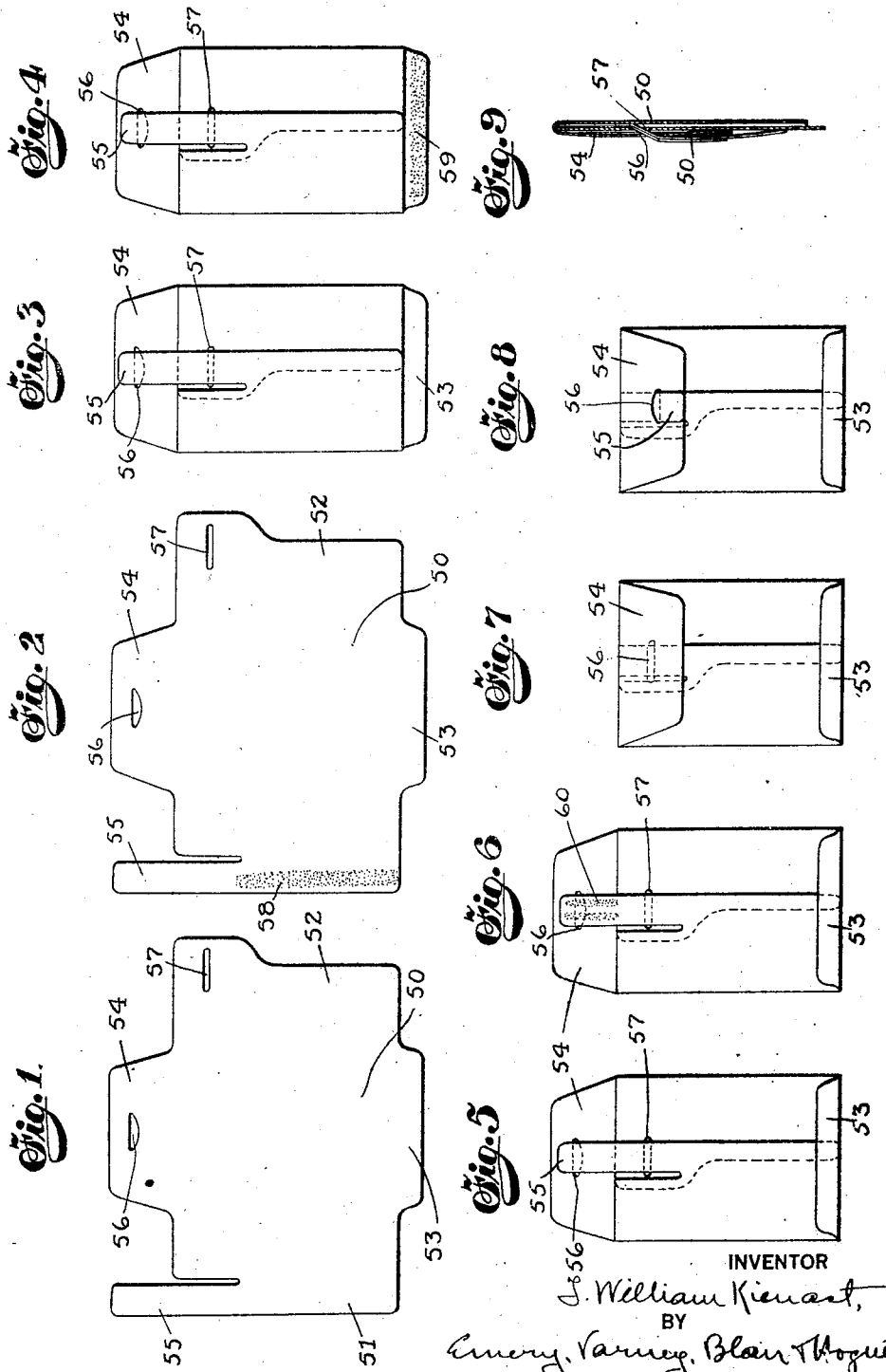
INVENTOR
T. William Kienast,
BY
Emery, Varney, Blair & Boquet
ATTORNEYS.

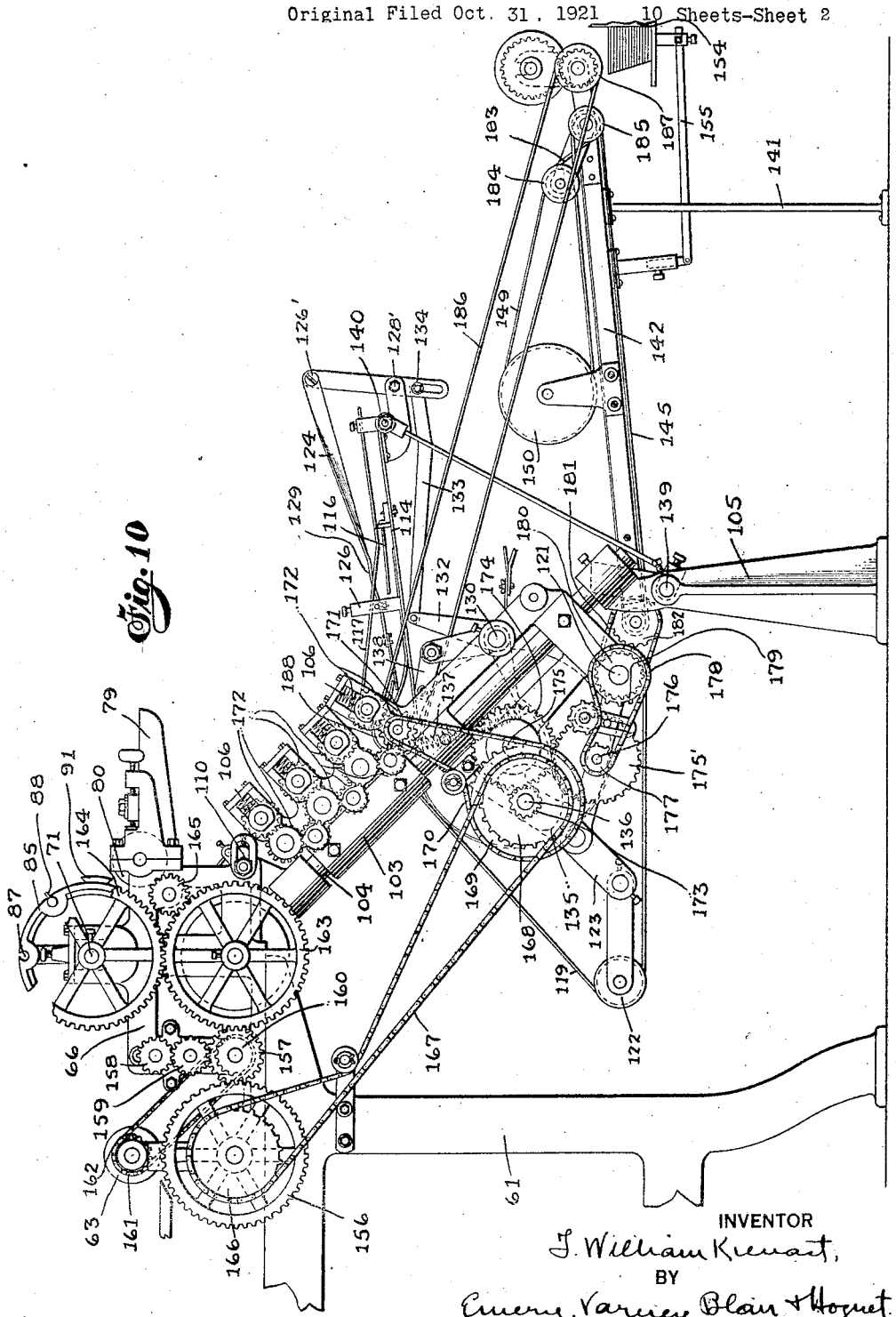

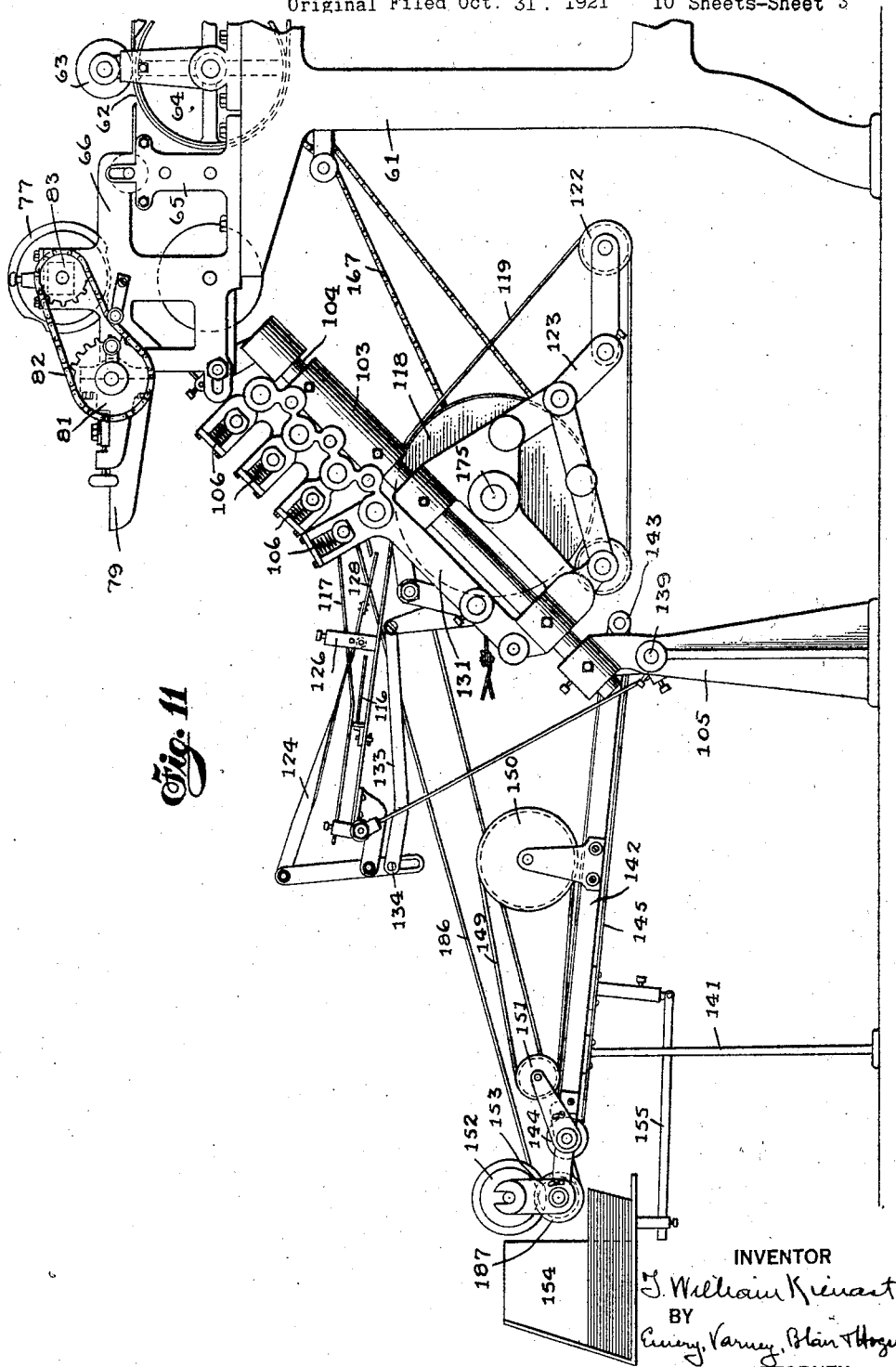

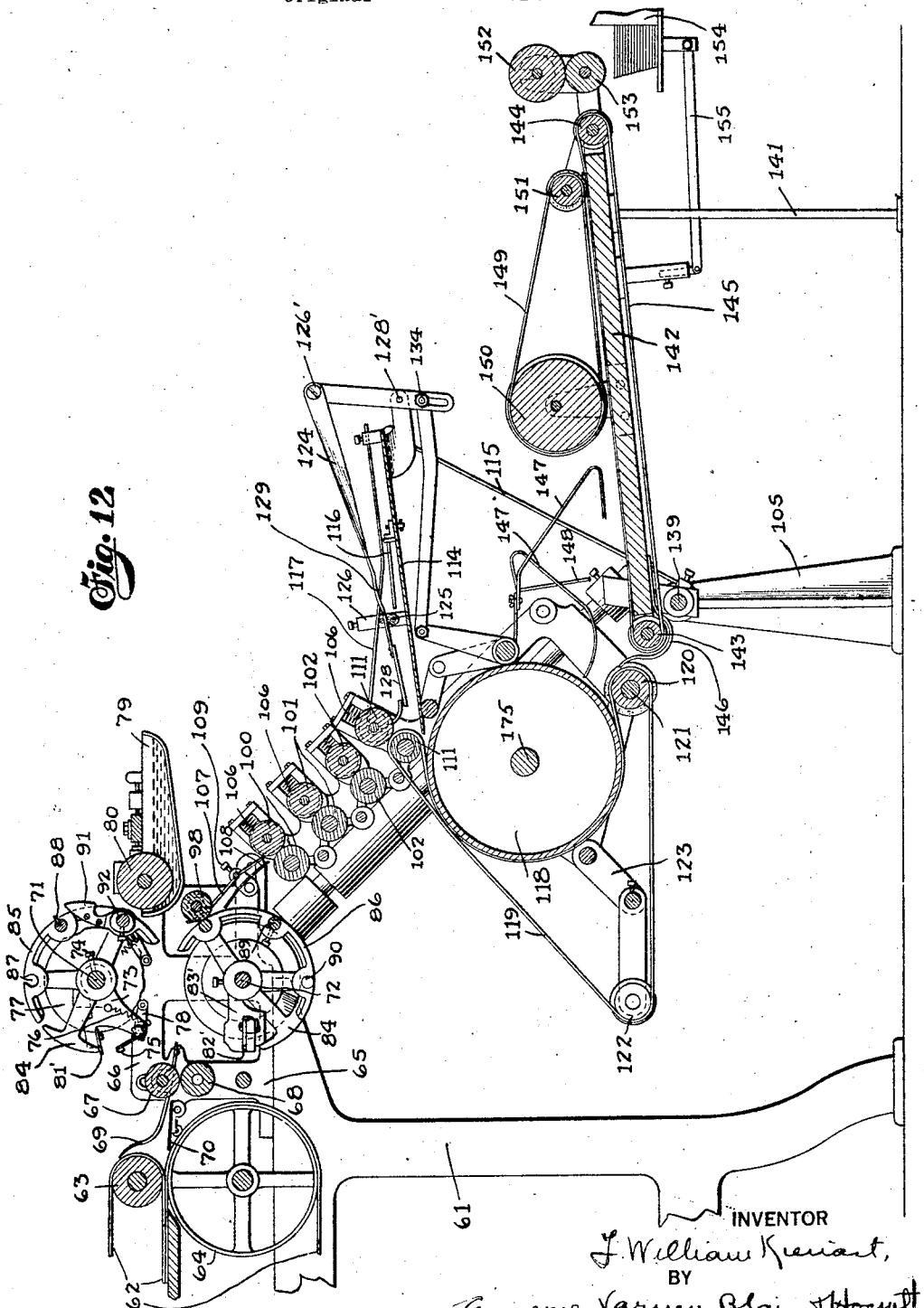

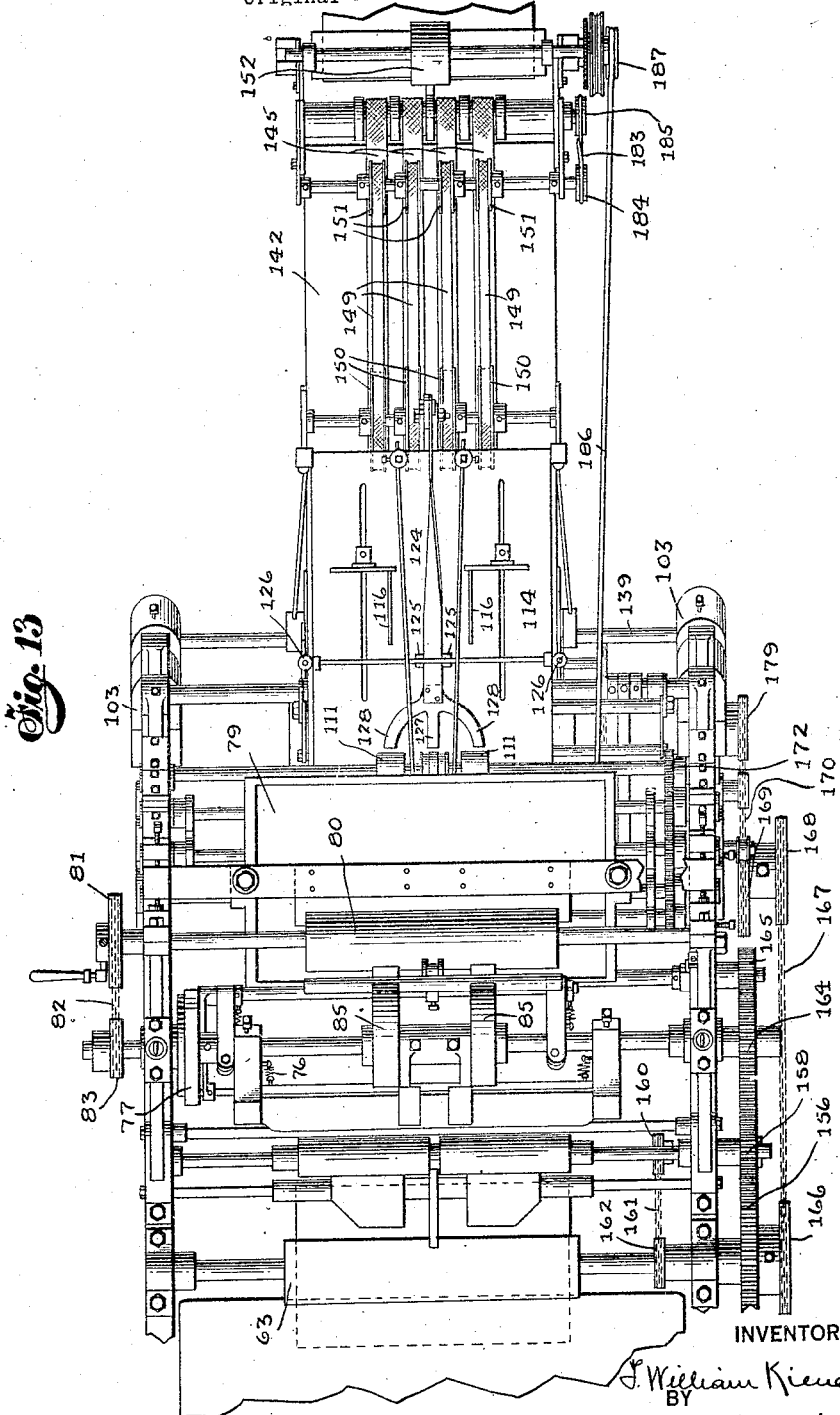

April 20, 1926.

T. W. KIENAST 1,581,316

ENVELOPE MACHINE

Original Filed Oct. 31, 1921  10 Sheets-Sheet 6

INVENTOR
J. William Kienast,
BY
Emery, Varney, Blair & Hoguet
ATTORNEYS

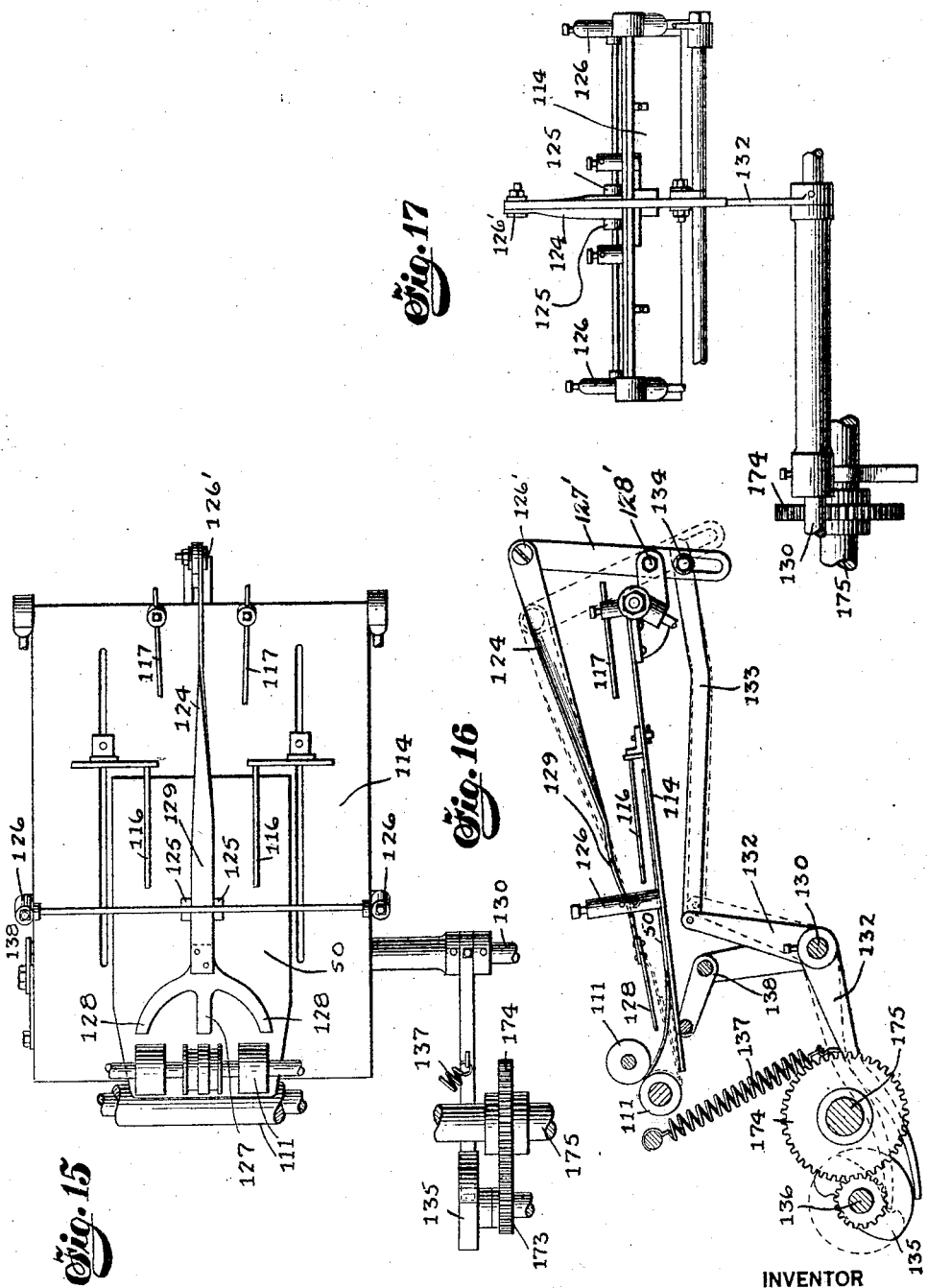

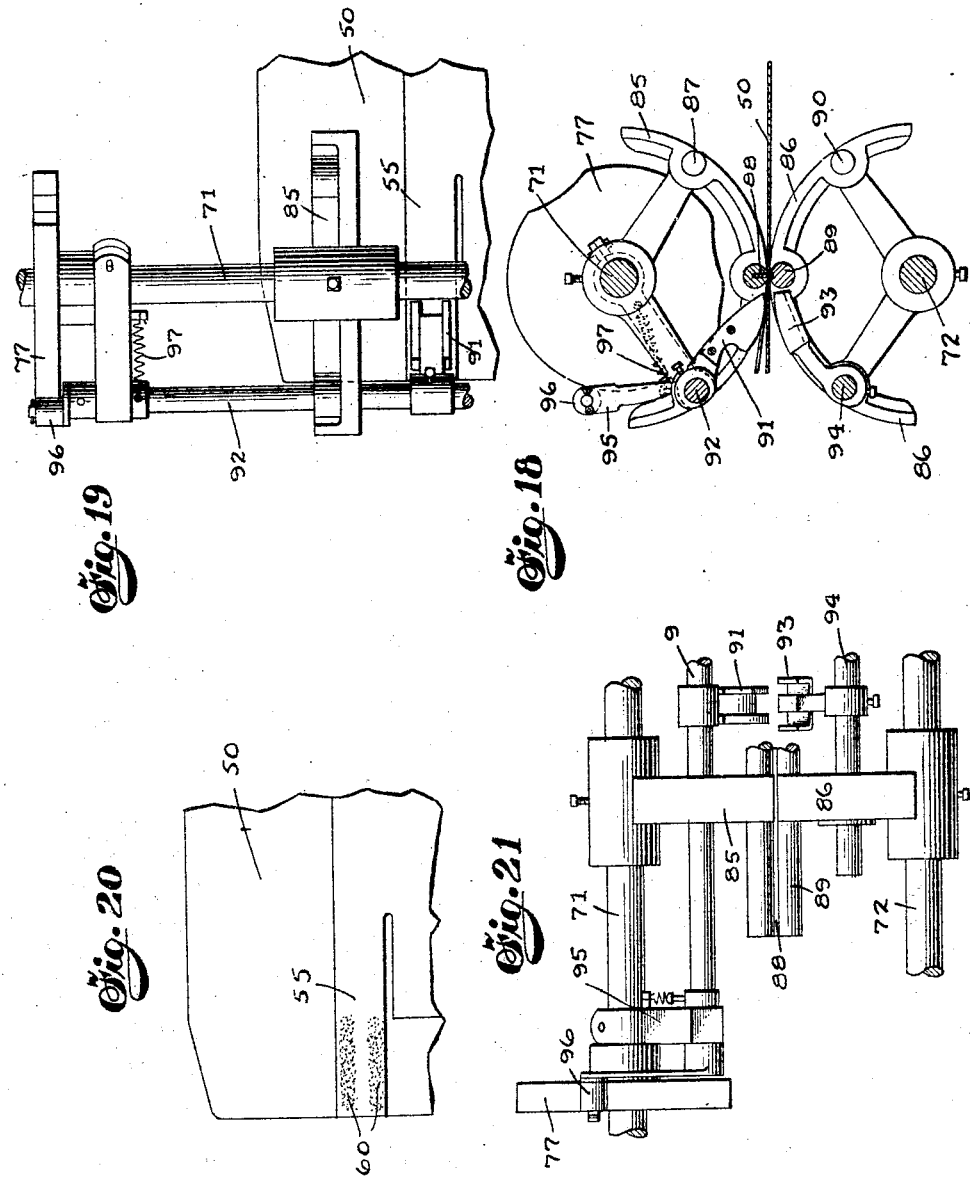

April 20, 1926.

T. W. KIENAST

ENVELOPE MACHINE

Original Filed Oct. 31, 1921   10 Sheets-Sheet 9

1,581,316

INVENTOR
T. William Kienast.
BY
Emery, Varney, Blair & Hoguet
ATTORNEYS

April 20, 1926.

T. W. KIENAST 1,581,316

ENVELOPE MACHINE

Original Filed Oct. 31, 1921    10 Sheets-Sheet 10

INVENTOR
T. William Kienast.
BY
Emery, Varney, Blair & Hoguet,
ATTORNEYS.

Patented Apr. 20, 1926.

1,581,316

UNITED STATES PATENT OFFICE.

TIMOTHY WILLIAM KIENAST, OF BROOKLYN, NEW YORK, ASSIGNOR TO HENRY TRENCHARD, JR., OF BROOKLYN, NEW YORK.

ENVELOPE MACHINE.

Application filed October 31, 1921, Serial No. 511,822. Renewed September 18, 1925.

*To all whom it may concern:*

Be it known that I, TIMOTHY WILLIAM KIENAST, a citizen of the United States, and a resident of Brooklyn, county of Kings, State of New York, have invented an Improvement in Envelope Machines, of which the following is a specification.

This invention relates to improvements in envelope making machines and particularly that type of machine illustrated in the United States patent to Vierengel, numbered 1,000,057, and issued August 8, 1911, wherein the previously formed envelope blanks have their flaps folded and secured.

The present invention is particularly adapted for the formation of envelopes of the type illustrated in United States patent to Trenchard numbered 1,171,006, and issued February 8, 1916, in the formation of which envelopes the side flaps are folded and secured, one end flap is folded over the secured side flaps and the opposite end flap and locking tongue therefore are folded ready to be interlocked and thus secured.

It is an object of the invention to provide a machine which will gum the end flap which is closed during the formation of the envelope, gum one portion of the locking tongue, fold this portion to overlie the body of the tongue and secure said overlying portion to the body.

Other objects of the invention will appear as the description progresses and I therefore will not here enumerate them in detail.

In the drawing I have shown one embodiment of my invention, but this is merely chosen for the convenience of illustration and I do not wish to be limited to the form therein shown for it is obvious that many changes may be made within the scope of the invention.

Figure 1 shows an envelope blank of one type operated upon by this invention.

Figure 2 shows the blank with the adhesive applied to one side flap,

Figure 3 shows the side flaps folded and secured,

Figure 4 shows one end flap with the adhesive applied thereto,

Figure 5 shows the end flap folded and secured,

Figure 6 shows the adhesive applied to the locking tongue prior to the folding of the same, Figure 7 shows the locking tongue and adjacent end flap folded, the two parts of the locking tongue being secured together, Figures 8 and 9 show the position of the locking tongue when it is operative to lock the adjacent end flap in closing position.

Figure 10 is a side elevation of the machine embodying the present invention,

Figure 11 is a similar view looking at the opposite side of the machine,

Figure 12 is a longitudinal vertical sectional view of the machine,

Figure 13 is a plan view,

Figure 26:
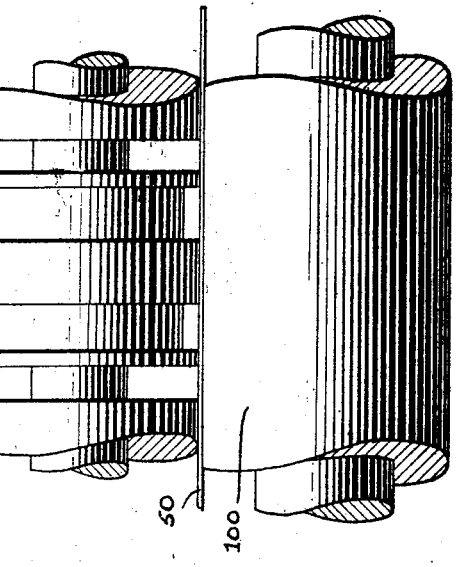
Figure 24:
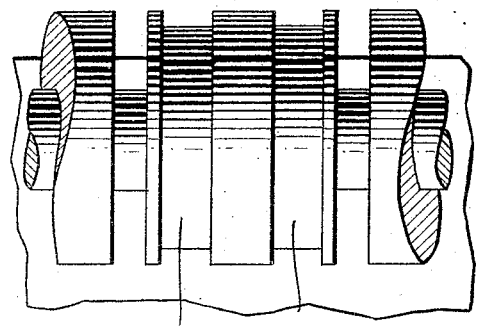
Figure 25:
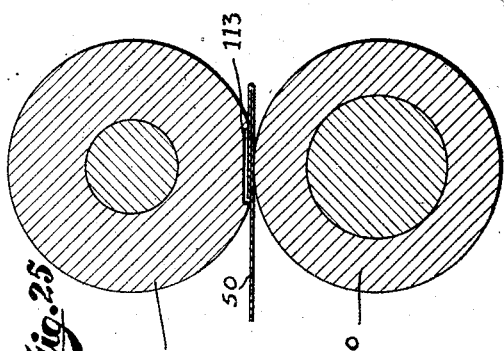
Figure 22:
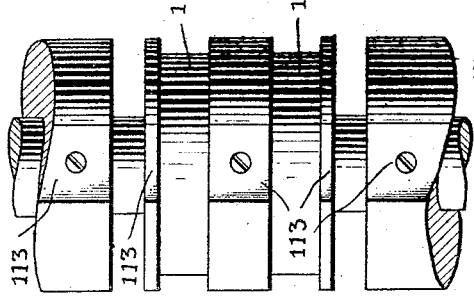
Figure 23:
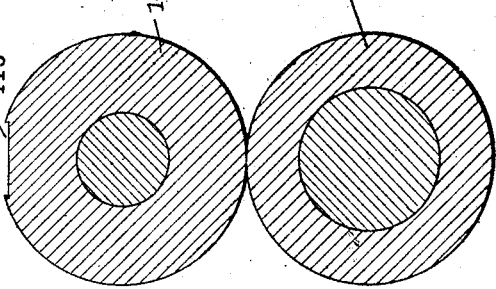
Figure 31:
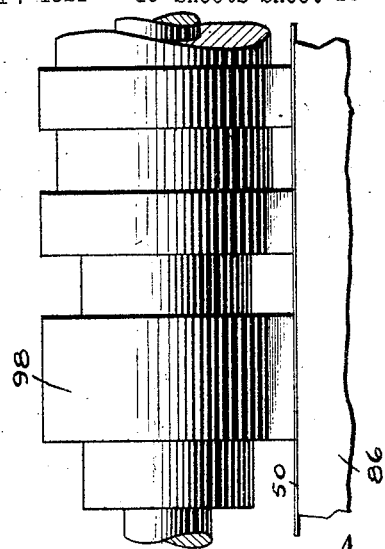
Figure 29:
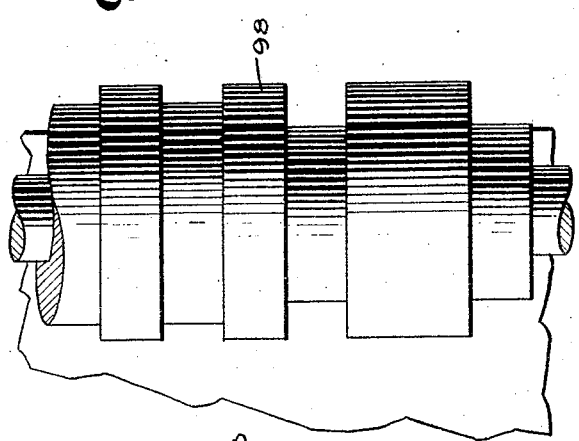
Figure 30:
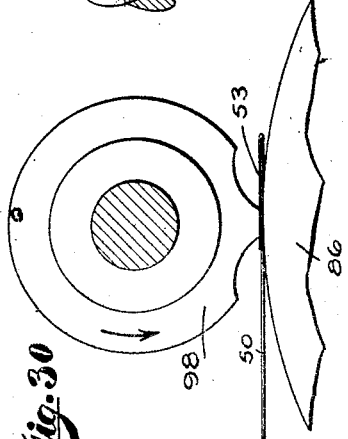
Figure 27:
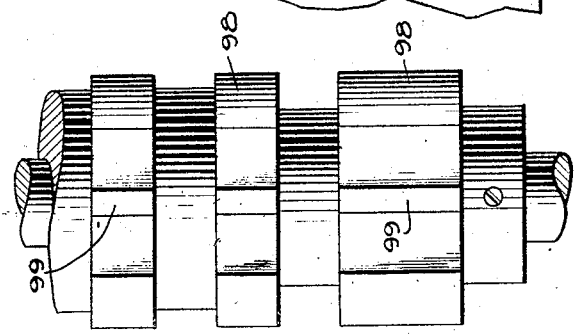
Figure 28:
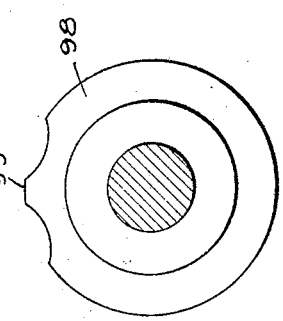

Figure 15 is an enlarged plan view of the locking tongue and end flap folding mechanism, Figure 16 is a fragmental side elevation of said folding mechanism, Figure 17 is an end elevation of the same, Figure 18 is a detail of the means for applying the adhesive to the locking tongue, Figure 19 is a plan view of the same, Figure 20 is a detail showing the application of the adhesive to the locking tongue, Figure 21 is an end elevation of the same, and Figures 22 to 31 are details of the feed and pressure rolls.

In the formation of envelopes of the type illustrated in the Trenchard patent by machines of the type illustrated in the Vierengel patent the blank 50 (see Figure 1) which is provided with side flaps 51 and 52, end flaps 53 and 54, a locking tongue 55 and apertures 56 and 57 through which the locking tongue is adapted to pass, first has the adhesive applied to the locking-tongue-carrying side flap 51, as at 58, Figure 2. The side flaps 51 and 52 are then folded into the positions shown in Figure 3 when pressure is applied to the flaps to cause the adhesion between the same. The side flaps having been secured together so that the locking tongue 55 is aligned with the apertures 56 and 57, adhesive is applied to one end flap 53, see Figure 4, at 59. This end flap 53 is then folded into the position shown in Figure 5 and secured. The adhesive is then applied to the locking tongue 55, preferably in the form of two strips 60, see Figure 6. After the application of the adhesive 60 the locking tongue 55 is folded so that one portion overlies the other and is secured thereto by the adhesive, thus strengthening the tongue and making it more rigid with the attendant advantages set forth in the Trenchard patent referred to. At the same time the adjacent end flap 54 is folded and overlies the locking tongue as shown in Figure 7. The envelope is then complete and ready to be locked closed by hand as shown in Figures 8 and 9.

The present improvement is for the purpose of applying the adhesive 59 to the end flap 53, folding the flap, applying the adhesive to the locking tongue 55, folding the tongue and folding the adjacent end flap 54. While the improvement is applicable particularly to the Vierengel type of machine it is quite obvious that it may be applied to and used in conjunction with other types of envelope machines.

Inasmuch as the present invention resides in the mechanism for applying the adhesive to the end flap and locking tongue of the already partly formed envelope and folding the locking tongue and adjacent end flap, I have illustrated only a portion of the mechanism which folds and secures the side flaps to illustrate its relation to the present invention. This portion of the mechanism illustrated includes a frame 61 on which a double belt conveyor 62 is mounted, passing around, at one end, pulleys 63 and 64.

A supplemental frame including side pieces 65 and 66 is supported on one end of the frame 61. A pair of guide rolls 67 and 68 are mounted between side pieces 65 and 66 to receive the partly formed envelopes from the conveyor 62, the envelopes being guided between the rolls by guides 69 and 70. These partly formed envelopes are fed between the rolls 67 and 68 with the ends which are to be permanently closed by the adhesion of the end flap, leading. Thus, the locking-tongue-bearing end of the envelope follows.

In order that the locking tongue and adjacent end flap may have adhesive applied thereto and the flap creased for subsequent folding and that the opposite end flap and locking tongue may be creased, I have mounted a pair of shafts 71 and 72 between the side pieces 65 and 66 of the supplemental frame. Secured to the upper shaft 71 are supporting arms 73 which are maintained in adjusted positions on the shaft by set screws 74. A pivoted adhesive applying wiper 75 is mounted between the arms 73 and is normally urged away from the shaft 71 by springs 76, being however, permitted to be moved away from the shafts to a greater extent at various times and subsequently retracted by the cooperation between a stationary cam 77 and an arm 78 rigid with the wiper, the arm having a roller on its end which rides on the cam surface. An adhesive supply trough 79 is mounted on the supplemental frame and is provided with a roller 80 which is rotated by a sprocket 81 which sprocket receives its motion from a chain 82. This chain also passes around a sprocket 83 on the shaft 71 and is driven thereby, the shaft being driven in a manner later to be described.

The surface of the cam 77 is so formed that when the wiper 75 is in position to engage the end flap of the envelope the roller on the arm 78 enters a depression and permits the springs 76 to project the wiper against the end flap, thus applying adhesive thereto. The roller then rides upon a rise in the cam and the wiper is again retracted so that it will clear the trough 79. But when the wiper arrives opposite the roll 80 from which it receives its adhesive, the roller on the arm 78 again enters a depression and the springs project the wiper against the roll 80, the cam again retracting it after the adhesive has been distributed on it.

Immediately following the wiper 75 on the arms 73 is a creasing blade 81' which cooperates with a slot 82' in a casting 83' carried by the lower shaft 72. This cooperating creaser 81' and slot 82' act to crease the leading end flap after the adhesive has been applied thereto and force the free end of the flap upwardly so that it will be in position to be folded in a manner now to be described.

A pair of segmental supports 84 bridge the space between the creaser 81' and the later described segmental frames 85 to support the envelopes after the same have been creased.

The shafts 71 and 72 also support segmental frame members 85 and 86 respectively, the member 85 carrying in any one of a series of pockets 87 a creasing bar 88 which cooperates with a socket bar 89, which is likewise mounted in any one of a series of pockets 90, to crease the opposite end flap and locking tongue.

While this mechanism is disclosed in the Vierengel patent referred to its description is necessary since it cooperates with the remainder of the mechanism later described in such a way as to make a new combination producing an advantageous result.

As clearly illustrated in Figure 7 of the drawing and described in the Trenchard patent hereinbefore referred to, the locking tongue is folded so as to double and strengthen the same.

In order that the folded-over portion of this locking tongue may be secured to the main or body portion of the tongue by adhesion, I have mounted a pair of adhesive applying blades 91 on the upper shaft, which blades are directly secured to a rock shaft 92 mounted on the segment 85. These blades have a complemental support 93 which is adjustably mounted on a shaft 94, the shaft being rigidly supported on the segment 86, see Figure 18. An arm 95 having a roller 96 thereon is rigid with the shaft 92 and is so positioned that the roller rides on the surface of the cam 77 which has previously been described. This roller 96 is maintained in contact with the cam surface by spring 97 and consequently the blades 91 are normally urged outwardly. Their outward movement is however controlled by the cam 77 and this cam is so formed that, when the blades 91 come opposite the support 93 for the envelopes, the blades move outwardly and apply the adhesive to the locking tongue 55 in two strips as shown in Figure 6 at 60. The blades are, however, retracted immediately so as to clear the adhesive trough 79. The cam then permits the springs to again force the blades 91 outwardly into engagement with the adhesive supply roll 80. After the application of the adhesive the blades are again withdrawn ready for another cycle of operations. Thus the portion of the locking tongue which is to be subsequently folded over onto and secured to the body portion has the two strips of adhesive applied thereto.

After the leading end flap of the envelope has had the adhesive applied thereto and creased, it is fed between the segmental frame 86 and a pressure roller 98. This roller 98 has a projecting ridge 99 which meets the folded end flap and presses it firmly into engagement with the previously folded and secured side flaps, thus causing the end flap to adhere thereto. A series of pairs of feed rollers 100, 101, 102, are mounted on side frames 103 which are supported on rods 104. These rods extend downwardly and outwardly from the pressure roll 98 and are supported at their lower ends by standards 105. The lower roller of each pair is mounted for rotation on a fixed axis, but the upper roller is spring pressed toward the lower roller by springs 106. The envelopes are fed to the first pair of rollers 100 from the pressure roller 98, being guided by the plates 107 and 108. The upper plate 107 is adjustable with relation to the lower plate by means of a set screw 109 and the pair are adjustable together; their relation to the rollers 100 and 98 may be varied as desired, by means of a slot and screw connection 110.

Figure 14:
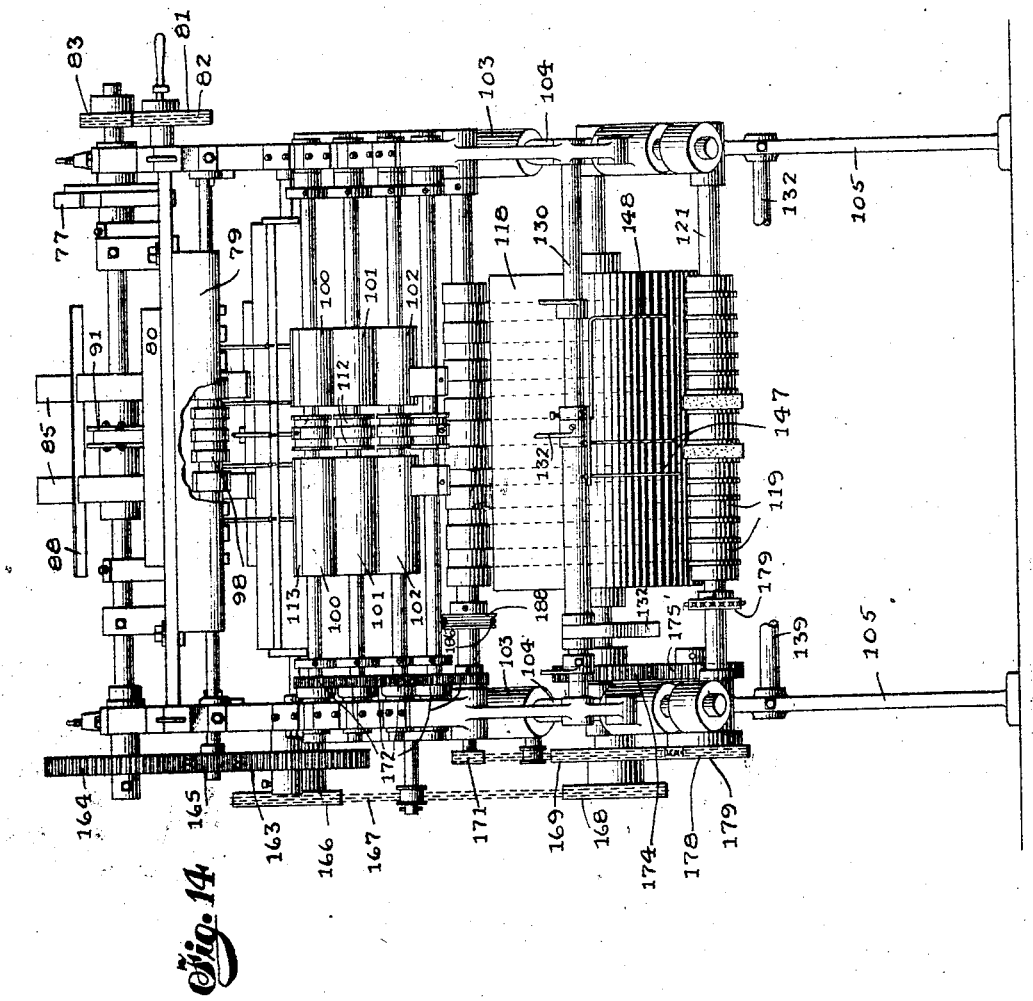
Figure 14 is an end elevation.

When the envelope passes between the rollers of the pairs 100, 101, and 102 and between an additional pair of rollers 111 mounted below the pair 102 the leading flap of the envelope is closed and secured and the locking tongue has the adhesive which has been applied thereto exposed on its upper face, the locking tongue not having yet been folded. Therefore, in order to prevent the adhesion of the tongue to the rollers with the obviously deleterious results I have made each of the upper rollers in three sections as clearly illustrated in Figures 14 and 22 to 26 inclusive. The end sections of each of these rollers has a plain surface which is adapted to engage the envelope at each side of the locking tongue and feed the same in cooperation with the lower rollers of the pairs. The middle section is however provided with grooves 112 with which the strips of adhesive on the locking tongues are adapted to register. This permits the envelopes to be fed between the rollers without the disturbance of the adhesive.

The upper rollers of the pairs are also provided with longitudinal grooves 113 to bridge the adhesive coated portions of the folded and secured flap 53 of the envelope before the adhesive becomes dry, thus avoiding disadvantageous consequences. A table 114 is mounted on brackets 115 to receive the envelopes as they pass from the lowermost pair of feed rolls 111, and is provided with a pair of abutments 116 which are adapted to arrest the movement of the envelopes and hold them in position to be further acted upon. These abutments are adjustable to accommodate envelopes of various sizes. A guide 117 turns the envelopes downwardly onto the table 114 as they pass from the rollers 111.

Mounted beneath the rollers 111 and at the forward edge of the table 114 is a drum 118. A conveyor belt 119 passes around the lower roller of the pair 111 and around a pulley 120 on a shaft 121 and thence around a pulley 122, which acts as a belt tightener, being mounted on the pivoted arm 123. This pulley 122 acts to hold one reach of the belt 119 tightly in contact with the drum 118. It will be noted that the edge of the table 114 extends directly toward the point where the belt 119 contacts with the surface of the drum 118, so that the envelope, when it is fed from the table in a manner later to be described, will pass between the belt and drum and be fed around the latter. It has been said that the envelope passes onto the table 114 with its closed end first, so that the direction of movement is reversed in the passage of the envelope.

In order that the locking tongue may be folded and the folded portion secured to the body portion and that the adjacent end flap may be folded, I have provided a tucker for engaging the locking tongue and end flap at the line where they have previously been creased, which tucker is operative to tuck the envelope between the conveyor belt 119 and the drum 118 with the creased portion leading and the locking tongue and adjacent end flap folded over and following, so that the pressure between the drum and belt will cause the adhesive to secure the folded over portion of the tongue to the body portion. This tucker comprises a reciprocatory arm 124 which operates between a pair of rollers 125 on standards 126 extending upwardly from the table 114. The end of the arm which engages the envelope is provided with a central finger 127 and two lateral fingers 128, the central finger being adapted to engage the locking tongue and the lateral fingers being adapted to engage the end flap at spaced points.

The end of the arm 124 remote from the end on which are fingers are mounted is secured, pivotally at 126′, to an oscillatory arm 127′ which arm 127′ is pivoted at 128′ to the table 114. It will be noticed that when the arm 124 is retracted, the direct line from the fingers 127 and 128 and the pivot 126′ intersects the lower roller of the pair 111, so in order to give the arm a movement along this line and then a downward movement and a continued movement substantially parallel to the first movement, I have provided the arm with an off-set portion 129. The necessity for this compound movement is that the leading edge of the envelope engages the abutments 116 before the entire envelope has cleared the rollers 111. The opposite end flap and locking tongue are therefore supported by the lower roller of the pair 111. When the arm 124 moves forwardly, the fingers engage the crease of the flap and locking tongues during the first movement of the arm. The continued movement of the arm gives the fingers 127—128 a downward movement carrying the then forward edge of the envelope downwardly in a position in line with the edge of the table 114 and the line of intersection between the belt 119 and the drum 118. The further movement of the arm 124 then tucks the creased portion of the end flap and locking tongue between the belt and drum where the envelope is gripped between the latter two elements and carried around the drum, the tucker being retracted for another operation. In its passage around the drum the adhesive coated portion of the locking tongue is pressed against the body portion of the tongue and the two are secured together, the end flap being, at the same time, folded.

The tucker is actuated in the following manner:

A rock shaft 130, see Fig. 16 is mounted in the position 131 of the frame which is supported by the rods 104. A bell crank 132 is secured to and rocks with the shaft 130 being connected at one end to the arm 127′ by a link 133 which link has adjustable connection 134 with the lever 127′. The end of the bell crank 132 opposite to that to which the link 133 is connected rides on a cam 135 which is secured to a shaft 136, being held on the cam face by a spring 137. The cam 135 acts to retract the tucker and to control the action of the spring 137 which latter acts to move the tucker forward to its operative position.

It will be noted that the forward end of the table 114 is supported from the shaft 130 by a pair of links 138. This and the fact that the brace 115 is pivoted at 139 to the standard 105 and at 140 to the table 114 thus make it possible to adjust the position of the table.

Supported on the standards 105 and standards 141 is a plate 142 at the ends of which pulleys 143 and 144 are mounted. Around these pulleys a conveyor 145 passes, the upper reach thereof being supported by the plate 142. The receiving end of this conveyor terminates adjacent to the discharge end of the conveyor 119 so that the envelopes which pass from between the conveyor 119 and the drum 118 are fed onto the conveyor 145 being guided thereon by a guard 146, an upper guard 147 and side guards 148. It will be noted that the pulley 120 around which the belt 119 passes is roughened and engages the envelopes as they pass therethrough so that they are given a rapid movement onto the conveyor 145.

The envelopes are fed by the movement of the conveyor 145 and after passing the last upper guide 147 pass beneath the guide belt 149 which is mounted on pulleys 150 and 151.

Adjacent to the discharge end of the conveyor 145 is a pair of rolls 152 and 153 between which the envelopes are fed from the conveyor. These rolls are arranged above a receiving hopper 154 which is adjustably supported by a bracket 155 and are adapted to rapidly discharge the envelopes into the hopper. The rolls also act to exert pressure on the folded flap and tongue of the envelope so as to press them into as flat a condition as possible before being discharged into the hopper.

Referring now to the means for actuating the several mechanisms which have been described the shaft on which the conveyor pulley 64 is mounted carries a gear 156 which meshes with a relatively smaller gear 157. This gear 157 drives the rollers 67 and 68 and the gears 158 and 159 which intermesh and the latter of which meshes with the gear 157. A sprocket 160 is secured to the shaft of the gear 157 and a chain 161 passes around this sprocket and around the sprocket 162 and the shaft of the pulley 63 thus actuating the latter.

The gear 157 also meshes with the gear 163 on the shaft 72 which gear 163 in turn meshes with a gear 164 of the same size, which latter gear is fixedly mounted on the shaft 71. These shafts 71 and 72 are thus rotated and the mechanism carried thereby is set into operation.

The pressure roller 98 is rotated by the intermeshing of a gear 165 on the shaft thereof with the gear 163.

As has been hereinbefore stated, the adhesive supporting roll 80 is rotated by the sprockets 81 and 83 and the chain 82 which receive their motion from the shaft 71.

Rigid with the gear 156 is a sprocket 166 around which a chain 167 passes which chain also passes around a sprocket 168 on the shaft 136 on which the tucker actuating cam 135 is mounted. The cam is therefore actuated by this chain. A second sprocket 169 is secured to the shaft, around which sprocket a chain 170 passes which chain also passes around a relatively smaller sprocket 171 on the shaft of the lower pulley of the pair 111. This shaft also carries a small gear through which all of the rollers of the pairs 100, 101, 102 and 111 are actuated. This actuation is accomplished by the intermeshing of the gears 172 with each other and with the gear 171, see Fig. 10.

On the shaft 136 a small gear 173 is secured which meshes with a relatively larger gear 174 on the shaft 175 of the drum 118. The intermeshing of these two gears causes the rotation of the drum 118 and consequently the feeding therearound of the envelope.

In order that the conveyor belt 119 and the mechanism which receives the envelopes from the same may be driven a gear 175' secured to a shaft 176 meshes with a gear 174. A sprocket 177 is rigid with the shaft 176 and around this sprocket a chain 178 passes which chain likewise passes around a sprocket 179 on the shaft 121. The actuation of the belt 119 results from this driving connection. A second sprocket 180 is secured to the shaft 121 and accommodates a chain 181 which passes around a sprocket 182 on the shaft of the pulley 143, thus resulting in the actuation of the conveyor 145. This conveyor 145 actuates the guide belt 149 by means of a crossed belt 183 which passes around a pulley 184 on the end of the shaft of the belt pulley 151 and around a similar pulley 185 on the shaft of the conveyor pulley 144.

The lower pressure roller 153 is driven by a belt 186 which passes around a pulley 187 rigid with the pulley 153 and around a pulley 188 on the shaft of the lower roller of the pair 111.

It is of course obvious that the specific driving means may be modified as the specific means is not essential to the operation of the various parts of the mechanism. It is only important that the means be capable of causing the same relative movements of the various parts.

While the operation of the machine has been described along with the description of the mechanism it is thought desirable to give a brief résumé of the same.

The envelopes pass from the conveyor 62 with the end which is to be permanently closed leading and the locking-tongue-carrying end following. The adhesive is applied to the leading end flap by the wiper 75 and the end flap is creased by the creasing blade 81. The thus creased end flap passes between the roller 98 and the segmental frame 86, the end flap is folded and pressed onto the previously folded side flaps so that it is secured.

When the locking tongue and adjacent end flap reach a position between the segmental frames 85 and 86 the spaced strips of adhesive are applied to the locking tongue by the blades 91, the tongue being supported by the element 93. After the application of the adhesive to the locking tongue the end flap and tongue are creased by the creasing blade 88. The envelope then passes downwardly between the rollers 100, 101, 102 and 111, the adhesive coated portions of the locking flap passing through the grooves of the rollers. The last pair of rollers 11 forces the envelope, closed end first, onto the table 114 until it engages the abutments 116 where the movement of the envelope is arrested. The envelope occupies the position shown in Fig. 16 when it engages the abutments 116 with the open end flap and locking tongue supported by the lower roller of the end pair 111. The tucker then moves forwardly and engages the envelope where the end flap and tongue are creased. The continued movement of the tucker carries this end of the envelope downwardly and forwardly until the envelope is tucked between the conveyor belt 119 and the drum 118, with the end flap folded back upon the envelope body and the locking tongue folded back upon itself.

In the passage of the envelope around the drum 118 the folded portion of the locking tongue is firmly pressed against the body portion and adheres thereto. The envelope is then fed to the conveyor 145 and into the hopper 154 where the successive envelopes are stacked.

I claim:

1. In a mechanism for forming envelopes having end flaps and a locking tongue, means for applying adhesive to the locking tongue, means for folding the tongue between its ends and means for pressing the adhesive coated portion of the tongue in contact with the body portion thereof.

2. In a mechanism for forming envelopes having end flaps and a locking tongue, means for applying adhesive to the locking tongue in spaced strips, and means for folding the adhesive coated portion of the tongue back upon the body portion.

3. In a mechanism for forming envelopes having end flaps and a locking tongue, means for applying adhesive to the locking tongue, and means for folding the adhesive coated portion of the tongue back upon the body portion thereof.

4. In a mechanism for forming envelopes having end flaps and a locking tongue, means for applying adhesive to the locking tongue, means for simultaneously creasing the locking tongue and adjacent end flap and means for folding the adhesive coated portion of the locking tongue back upon the body thereof.

5. In a mechanism for forming envelopes having end flaps and a locking tongue, means for applying adhesive to and closing one end flap, means for feeding the envelope to the aforementioned means with said end flap leading, means for applying adhesive to the locking tongue and means for folding the adhesive coated portion of the tongue back upon the body thereof.

6. In a mechanism for forming envelopes having end flaps and a locking tongue, means for applying adhesive to and closing one end flap, means for feeding the envelope to the aforementioned means with said end flap leading, blades for applying adhesive to the locking tongue, and means for folding the adhesive coated portion of the tongue back upon the body thereof.

7. In a mechanism for forming envelopes having end flaps and a locking tongue, means for applying adhesive to and closing one end flap, means for feeding the envelope to the aforementioned means with said flap leading, means for applying adhesive to the locking tongue, means for folding the adhesive coated portion of the tongue back upon the body thereof, said means including a cooperating drum and pressure belt, and means for forcing the envelope between the same.

8. In a mechanism for forming envelopes having end flaps and a locking tongue, means for applying adhesive to and closing one end flap, means for feeding the envelope to the aforementioned means with said flap leading, means for applying adhesive to the locking tongue, means for folding the adhesive coated portion of the tongue back upon the body thereof, said means including a cooperating drum and pressure belt, and a tucker for forcing the envelope between the same.

9. In a mechanism for forming envelopes having end flaps and a locking tongue, means for applying adhesive to and closing one end flap, means for feeding the envelope to the aforementioned means with said flap leading, means for applying adhesive to the locking tongue, means for folding the adhesive coated portion of the tongue back upon the body thereof, said means including a cooperating drum and pressure belt, and a reciprocatory tucker for forcing the envelope between the same.

10. In a machine for forming envelopes having end flaps and a locking tongue, means for applying adhesive to the locking tongue including an adhesive applying blade and a support for the envelope, means for moving the blade and support into registry with each other, and means for projecting the blade toward the support.

11. In a machine for forming envelopes having end flaps and a locking tongue, means for applying adhesive to the locking tongue including a rotatable support, an adhesive applying blade pivoted on said support, means for projecting said blade outwardly at predetermined points in the rotation of the support, and means for controlling said projecting means.

12. In a machine for forming envelopes having end flaps and a locking tongue, means for applying adhesive to the locking tongue including a rotatable support, an adhesive applying blade pivoted on said support, resilient means for projecting said blade outwardly at predetermined points in the rotation of the support and means for controlling said projecting means.

13. In a machine for forming envelopes having end flaps and a locking tongue, means for applying adhesive to the locking tongue including a rotatable support, an adhesive applying blade pivoted on said support, means for projecting said blade outwardly at predetermined points in the rotation of the support, and a cam for controlling said projecting means.

14. In a machine for forming envelopes having end flaps and a locking tongue, means for applying adhesive to the locking tongue including a rotatable support, an adhesive applying blade pivoted on said support, resilient means for projecting said blade outwardly at predetermined points in the rotation of the support, and a cam for controlling said projecting means.

15. In a machine for forming envelopes having end flaps and a locking tongue, means for applying adhesive to the locking tongue including a rotatable support, an adhesive applying blade pivoted on said support, resilient means for projecting said blade outwardly at predetermined points in the rotation of the support, and a stationary cam for controlling said projecting means.

16. In a machine for forming envelopes having end flaps and a locking tongue, means for applying adhesive to one end flap, means for applying adhesive to the locking tongue, means for creasing said tongue and adjacent end flap, and common means for supporting all of said means.

17. In a machine for forming envelopes having end flaps and a locking tongue, means for applying adhesive to one end flap, means for applying adhesive to the locking tongue, means for creasing said tongue and adjacent end flap, and a rotatable segmental frame for supporting all of said means.

18. In a machine for forming envelopes having end flaps and a locking tongue, means for applying adhesive to the locking tongue including a rotatable shaft, a frame carried by said shaft, a pair of adhesive applying blades pivoted on said frame and having an extended arm, a stationary cam on which said arm operates, and resilient means for maintaining said arm in contact with said cam.

19. In a machine for forming envelopes having end flaps and a locking tongue, means for applying adhesive to the locking tongue including a rotatable shaft, a frame carried by said shaft, a pair of adhesive applying blades pivoted on said frame and having an extended arm, a stationary cam on which said arm operates, resilient means for maintaining said arm in contact with said cam, and an adjustable envelope support adapted to cooperate with said blades.

20. In a machine for forming envelopes having end flaps and a locking tongue, means for applying adhesive to the locking tongue including a rotatable shaft, a frame carried by said shaft, a pair of adhesive applying blades pivoted on said frame and having an extended arm, a stationary cam on which said arm operates, resilient means for maintaining said arm in contact with said cam, an adjustable envelope support adapted to cooperate with said blades, and means for moving said blades and support into registry with each other.

21. In a machine for forming envelopes having end flaps and a locking tongue, means for applying adhesive to the locking tongue, means for folding said locking tongue, and means for transferring the envelope from the former to the latter means without contact with the applied adhesive.

22. In a machine for forming envelopes having end flaps and a locking tongue, means for applying adhesive to the locking tongue, means for folding said locking tongue, and means for transferring the envelope from the former to the latter means including a series of grooved rollers.

23. In a machine for forming envelopes having end flaps and a locking tongue, means for applying adhesive to the locking tongue, means for creasing the tongue and adjacent end flap, a cooperating conveyor belt and drum, and means engageable with the envelope to force the same between the belt and drum with the creased portion leading and the flap and tongue bent backwardly.

24. In a machine for forming envelopes having end flaps and a locking tongue, means for applying adhesive to the locking tongue, means for creasing the tongue and adjacent end flap, a cooperating conveyor belt and drum, and a reciprocating arm engageable with the envelope to force the same between the belt and drum with the creased portion leading and the flap and tongue bent backwardly.

25. In a machine for forming envelopes having end flaps and a locking tongue, means for applying adhesive to the locking tongue, means for creasing the tongue and adjacent end flap, a cooperating conveyor belt and drum, and a reciprocating arm having a plurality of separated envelope engaging fingers thereon engageable with the envelope to force the same between the belt and drum with the creased portion leading and the flap and tongue bent backwardly.

26. In a machine for forming envelopes having end flaps and a locking tongue, means for applying adhesive to the locking tongue, means for creasing the tongue and adjacent end flap, a cooperating conveyor belt and drum, a reciprocating arm having a plurality of separated envelope engaging fingers thereon engageable with the envelope to force the same between the belt and drum with the creased portion leading and the flap and tongue bent backwardly, and means for imparting a movement above and then directly toward the intersection of the conveyor belt with the peripheral face of the drum.

27. In a machine for forming envelopes having end flaps and a locking tongue, means for closing the end of the envelope opposite to the tongue carrying end, a work supporting table, means for feeding the envelopes to the work table with their closed ends leading, means for arresting the movement of the successive envelopes so that the locking tongue and adjacent flap are supported by said feeding means above the work table, a cooperating conveyor belt and drum, and means for engaging the tongue and adjacent flap and forcing the same between the belt and drum.

28. In a machine for forming envelopes having end flaps and a locking tongue, means for closing the end of the envelopes opposite to the tongue carrying end, a work supporting table, means for feeding the envelopes to the work table with their closed end leading, means for arresting the movement of the successive envelopes so that the locking tongue and adjacent flap are supported by said feeding means above the work table, a cooperating conveyor belt and drum, and a reciprocatory arm for engaging the tongue and adjacent flap and forcing the same between the belt and drum.

29. In a machine for forming envelopes having end flaps and a locking tongue, means for applying adhesive to one end flap and closing the same, means for applying adhesive to the locking tongue, means for creasing the tongue and adjacent end flap, means folding the tongue and adjacent end flap, means for feeding the envelope to the folding means including a reciprocatory arm, and means for conveying the envelopes successively from the folding means.

In testimony whereof, I have signed my name to this specification this 27th day of October, 1921.

T. WILLIAM KIENAST.